(12) United States Patent
Jurkat

(10) Patent No.: US 7,949,434 B2
(45) Date of Patent: May 24, 2011

(54) METHOD FOR CONTROLLING A WIND ENERGY PARK

(75) Inventor: Mark Jurkat, Norderstedt (DE)

(73) Assignee: Nordex Energy GmbH, Norderstedt (DE)

( * ) Notice: Subject to any disclaimer, the term of this patent is extended or adjusted under 35 U.S.C. 154(b) by 304 days.

(21) Appl. No.: 12/174,447

(22) Filed: Jul. 16, 2008

(65) Prior Publication Data
US 2009/0309361 A1 Dec. 17, 2009

(30) Foreign Application Priority Data
Jun. 16, 2008 (DE) .......................... 10 2008 028 573

(51) Int. Cl.
*G05B 9/02* (2006.01)
*H02P 9/04* (2006.01)
(52) U.S. Cl. .............................. 700/287; 700/82; 290/44
(58) Field of Classification Search .................... 700/82, 700/287; 290/44
See application file for complete search history.

(56) References Cited

U.S. PATENT DOCUMENTS

| | | | | |
|---|---|---|---|---|
| 7,437,203 B2 * | 10/2008 | O'Donnell et al. | ............ | 700/82 |
| 2002/0099487 A1 * | 7/2002 | Suganuma et al. | ............ | 701/48 |
| 2009/0309360 A1 * | 12/2009 | Jurkat | ............ | 290/44 |

FOREIGN PATENT DOCUMENTS

| DE | 102004056223 A1 | 5/2006 |
|---|---|---|
| DE | 60219705 T2 | 1/2008 |

OTHER PUBLICATIONS

Reichard, M., Finney, D., and Garrity, J. "Windfarm System Protection Using Peer-to-Peer Communications". IEEE (Mar. 2007): 511-521.*

* cited by examiner

*Primary Examiner* — Ryan A Jarrett
(74) *Attorney, Agent, or Firm* — Vidas, Arrett & Steinkraus

(57) ABSTRACT

The present invention is related to a method for controlling a wind energy park with plural wind energy plants and plural control units, which perform control tasks in the wind energy park, comprising the following steps:

a) one priority at a time is assigned to the control units, depending on the control tasks they must perform, b) during the operation of the wind energy park, the control units communicate continuously with each other and/or with a central communication unit, c) in case that a failure of a first control unit of the wind energy park takes place, a second control unit of the wind energy park takes over the control tasks of the defective control unit, wherein the second control unit is selected depending on the priority assigned thereto and has the same as or a lower priority than the defective control unit.

19 Claims, 1 Drawing Sheet

METHOD FOR CONTROLLING A WIND ENERGY PARK

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a method for controlling a wind energy park with plural wind energy plants and plural control units, which perform control tasks in the wind energy park. A wind energy park consists of plural systems. Among the same, there are wind energy plants, weather masts, measuring stations in transfer stations, central wind energy park controls, condition monitoring systems (CMS) and other controls, for instance. Each one of the systems of a wind energy park has its own task and has one or several control units for performing the respective assigned control tasks. In addition, each one of the systems has usually input and/or output assembly groups, which are connected to the sensors and/or actuators which are necessary for the system. Thus, a weather mast has sensors for air pressure, wind velocity, wind direction and air humidity, for instance. Instead, a control unit has rotational speed sensors, or pumps and heatings as actuators, for instance.

A problem arises when there is a failure of a control unit. In such a case, according to the circumstances, the control tasks to be performed by the control unit can no more be exerted. This may affect the operation of the wind energy park.

Departing from the clarified state of the art, the present invention is based on the objective to provide a method of the kind mentioned at the beginning, in which the availability of the wind energy park and of its components is always at hand.

BRIEF SUMMARY OF THE INVENTION

According to a first aspect of the invention, the objective is resolved by a method of the kind mentioned at the beginning, comprising the following steps:
a) one priority at a time is assigned to the control units, depending on the control tasks they must perform,
b) during the operation of the wind energy park, the control units communicate continuously with each other and/or with a central communication unit,
c) in case that there is a failure of a first control unit of the wind energy park, a second control unit of the wind energy park takes over the control tasks of the defective control unit, wherein the second control unit is selected depending on the priority assigned thereto and has the same as or a lower priority than the defective control unit.

According to the present invention, the control units serve for controlling different components of the wind energy park, for instance wind energy plants, weather stations (weather masts), measurements at transfer stations, CMS and so on. They may also belong to a central wind energy park control. The control units may be parts of control systems with input- and/or output assembly groups, which are connected to the actuators and/or sensors required for the respective system. Each system can have one or plural control units. As a matter of course, the control units can in principle also perform a closed loop control, besides to a simple control.

According to the first aspect of the invention, different priorities are assigned to the control units, wherein the same are awarded depending on the importance of the respective control unit for the wind energy park. Thus, for instance logging a wind velocity or the power at a certain measurement point under certain circumstances is not as important as the generation of power by a wind energy plant. Also, the operation of one individual wind energy plant may be less important than the central control of a wind energy park with plural wind energy plants, for instance, in the case that such a control is stipulated as a prerequisite for the operation of the wind energy park. The control units are in continuous communication. The same may take place in a cyclic manner in regular intervals, for instance. In the frame of this communication, they can write data into decentral memories (flash or the like) of the other control units, for instance, or notify them to a central communication unit. For instance, the control units transmit their respective status in the frame of the communication. However, they may also transmit measurement- and control data, settings and so on. The central communication unit may be a master control with one or plural masters servers. Due to the continuous communication of the control units, it is known in every point of time which of the control units are ready for operation and which are not.

In the present context, there is a failure of a control unit (a breakdown for instance) when the same does no more participate in the communication. The control tasks of the defective control unit are then taken over by another control unit having the same or a lower priority. Through this, for instance, in the case that the control unit which takes over the control tasks of the defective control unit can no more perform its own control tasks thereafter, there is no breakdown of control tasks which are more important than those of the defective control unit. When the control unit taking over the control tasks of the defective control unit has a lower priority, only control tasks break down which are less important for the operation of the wind energy park. Thus, in the frame of the available control capacity, it is ensured that the most important control tasks of the wind energy park can always be performed. It may be advantageous that the control unit taking over the control tasks of the defective control unit has the lowest priority which can be awarded. In this case, when plural control units break down, only a minimal change of the assignment of control tasks is necessary.

The selection of the control unit "replacing" the defective control unit can take place automatically, for instance, this may be performed by the central communication unit, or it may take place due to a preset order. However, the selection can also take place manually by an operator. The central communication unit can possess prioritization rules for the distribution of the control tasks.

As soon as the defective control unit is ready for function again, it takes over its tasks again, and the control unit which had temporarily taken over its tasks before performs its own tasks again, or control tasks of another control unit which is broken down. Thus, a successive beginning again of control tasks according to priority may take place.

The method of the present invention increases the availability of control systems in a wind energy park by an intelligent, redundant task distribution. In this, important defective single system controls can be replaced temporarily, so that it is always ensured that important tasks are performed. In particular, the method is advantageous in greater or difficulty accessible wind energy parks, offshore wind energy parks for instance. In this, the redundancy has not necessarily to be limited to controls in a wind energy park. Instead, it might also be used in visualisations or historical data memories, respectively, which run on the basis of personal computers, for instance.

Preferably, the communication between the controls and with the central communication unit takes place via a bus technology. For instance, the same can be operated via wireless, light wave guide or even electrically, with different protocol techniques, like Ethernet, Profinet, Ethercat and so on. In this, the required protocol medium can be available for each control unit in a wind energy park network. The corresponding hardware has then to be dimensioned for the used protocol bus-systems.

According to one embodiment, the second control unit (1, 2A, 2B, 2C, 2D, 3, 4) can have performed own control tasks before taking over the control tasks of the defective control unit. After taking over the control tasks of the defective control unit, it is possible that the second control unit continues to perform its own control tasks it had performed before. Thus, in this case the control unit can perform plural tasks at the same time, two or more for instance. No breakdown of control activities takes place in this case. But it is also possible that after taking over the control tasks of the defective control unit, the second control unit does no more perform its own control tasks which it had performed before. In this case, it is conceivable that a third control unit of the wind energy park takes over the control tasks of the second control unit. The third control unit can take over the control tasks of the second control unit in addition to its own tasks, or instead of own tasks. In every case, the availability of the wind energy park control can be increased further by the successive redistribution of the control tasks. In particular, when the third control unit performs the control tasks of the second control unit instead of its own tasks, the third control unit can in turn be selected depending on the priority assigned to it, and it may have the same as or a lower priority than the second control unit. Then, it is ensured again that only control tasks break down which are less important for the wind energy park.

The second control unit may also be a replacement control unit, which did not perform own control tasks before taking over the control tasks of the defective control unit. Thus, a reserve control unit is kept at hand, which serves only for taking over the tasks of defective control units. Then, it is ensured that in the case of a failure of a control unit, no breakdown of control tasks of the wind energy park occurs.

In order to ensure that at further breakdowns of control units, a control unit which has already stepped into the breach for a control unit with higher priority is not used for taking over further, possibly less prioritized control tasks and thus can possibly no more perform its higher prioritized control tasks of the control unit first broken down, the higher priority of the second control unit can be assigned to a first control unit after taking over the control tasks of a second control unit with higher priority, for so long as it performs the control tasks of the second control unit.

According to a second aspect of the present invention, the objective is resolved by a method of the previously mentioned kind, comprising the following steps:
a) during the operation of the wind energy park, the control units communicate continuously with each other and/or with a central communication unit,
b) in case that there is a failure of a first control unit of the wind energy park, a second control unit of the wind energy park, which has performed its own control tasks before, takes over the control tasks of the defective control unit, wherein the second control unit is selected depending on whether it has sufficient capacity for performing the control tasks of the defective control unit in addition to its owns control tasks, and the second control unit performs its own control tasks as well as the control tasks of the defective control unit subsequently.

With respect to the second aspect of the present invention, what was said for the first aspect of the present invention applies in an analogous way. However, in difference to the first aspect of the present invention, no prioritization of the control units has to take place, (but as a matter of course, priorities can be assigned to the control units also, like in the first aspect of the invention). In this aspect of the invention, the selection of the control unit taking over the control tasks of the defective control unit takes place depending on whether the same has a sufficient capacity for performing its own control tasks as well as the control tasks of the defective control unit. In so far as a prioritization of the control units takes place anyway, the control unit which takes over the tasks of the defective control unit may even have a higher priority than the defective control unit. Thus, it is ensured in this aspect of the invention that even at a breakdown of a control unit, all the control tasks of the wind energy park can still be performed.

According to a further embodiment of the present invention, at least one control unit can have at least one control program for performing the control tasks of at least one other control unit of the wind energy park. In principle, the wind energy plant controls of a wind energy park can have the same control program. Furthermore, all the weather masts of a wind energy park can have their own program, and in turn the central park controls their own program, for instance. In this, the individual wind energy plants have only different parameters, for instance. In order to permit that one wind energy plant control can replace for instance a central park control in the case of a failure anyway, the control program of the defective control unit has to be provided to the wind energy plant control. In this, the task field, the program, addresses of sensors/actuators as well as operational parameters are memorized once and/or cyclically, manually and/or automatically, centrally and/or decentrally in particular. In this embodiment of the present invention, all or certain control programs of other control units can be kept at hand in each control unit, those of one or plural control units with higher priority in particular, in addition to the respective own control program. For instance, a weather mast can possess the wind energy plant program, but not the wind energy park control program. The latter may in turn be provided at all wind energy plant controls in addition.

Alternatively, it is possible that the control units retrieve a control program for performing the control tasks of another control unit from a central communication unit according to necessity, before taking over the control tasks of the other control unit. Also, they may retrieve the program from another control unit, a central wind energy park control unit for instance.

When the control units communicate with a central communication unit, the latter can perform the assignment of the control tasks to the control units in the case of a failure of a control unit. The central communication unit can be formed by the central wind energy park control unit. But it may also form a control unit which is separate from the control units. The communication unit takes over the distribution of the control tasks to the control units, in particular also the decision which control unit must take over the tasks of the defective control unit in the case of a failure. For this purpose it can have prioritization rules, a prioritization table for instance.

For the further development of the redundancy, even the central communication unit can be provided to be multiplicate, and thus to be redundant.

According to an alternative embodiment, the control units can communicate with each other and the assignment of the control tasks to the control units in case of a failure of a control unit can take place automatically, according to an order which was preset before. Thus, in this embodiment no communication via a central communication unit has to take place. Instead, there is an automatic co-ordination of the tasks, wherein the control units decide themselves about the task distribution. For this purpose, a suitable order of the control units can be preset before.

Both aspects of the present invention with its respective embodiments can also be combined with each other, of course.

BRIEF DESCRIPTION OF THE VIEWS OF THE INVENTION

One example of the realisation of the present invention is explained in more detail by means of figures in the following.

DETAILED DESCRIPTION OF THE INVENTION

Figure 1:
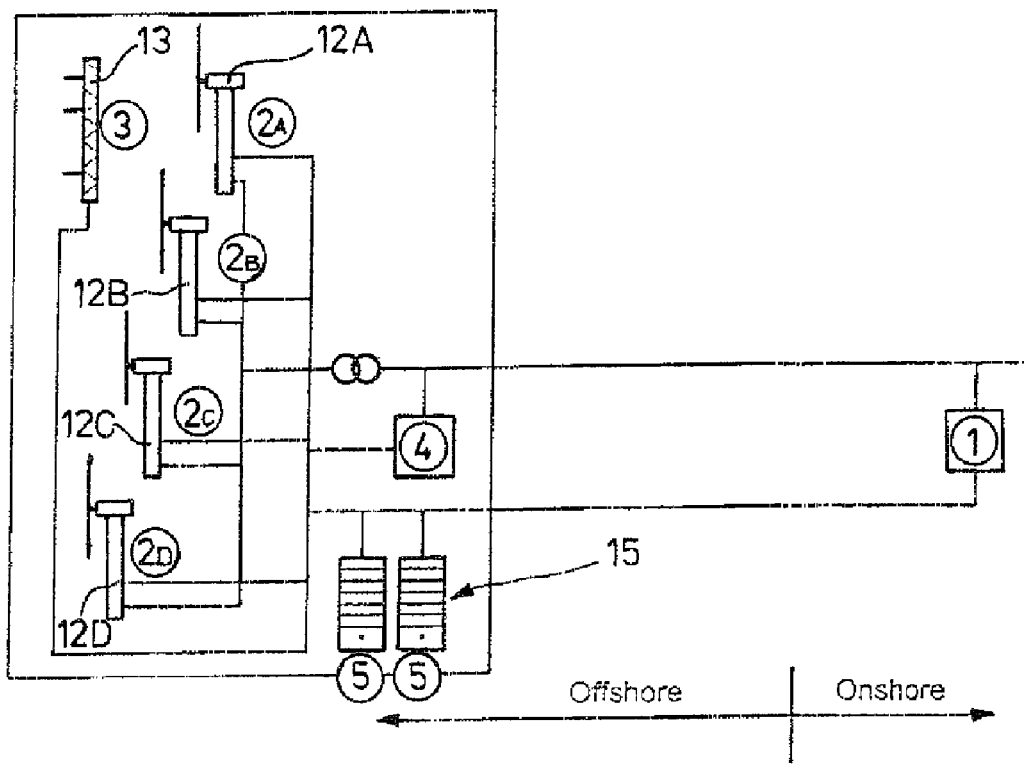
FIG. 1 shows a schematic representation of a wind energy park.

While this invention may be embodied in many different forms, there are described in detail herein a specific preferred embodiment of the invention. This description is an exemplification of the principles of the invention and is not intended to limit the invention to the particular embodiment illustrated As far as not indicated otherwise, equal reference signs denote equal objects in the figures. In the FIGS. 1 and 2, a wind energy park is shown, whose main components are located offshore, i.e. in the sea before a coast. The wind energy park has plural wind energy plants 12A, 12B, 12C, 12D. For their control, each of the wind energy plants 12A, 12B, 12C, 12D has one schematically shown control unit 2A, 2B, 2C, 2D. Furthermore, the wind energy park has a weather mast 13, which has also a schematically shown control unit 3. A further control unit 4 serves for controlling an additional measurement, for a measurement point 4 for instance. In addition, a central communication unit 15 is provided, which has two central servers 5 in the shown example, on which control programs, measurement- and control data as well as settings or parameters, respectively, are provided. As the only component arranged on the coast (onshore), a further control unit 1 is provided, in the example the central wind energy park control for driving the different components of the wind energy park. All components of the wind energy park are connected to each other and with the central communication unit 15 via corresponding lines. As a matter of course, further control units may also be provided. In practice, it is usual to provide an own control system with an own control unit for each control task in the wind energy park. The construction of such a wind energy park is per se known to those skilled in the art, so that it is not explained in more detail.

Figure 2:
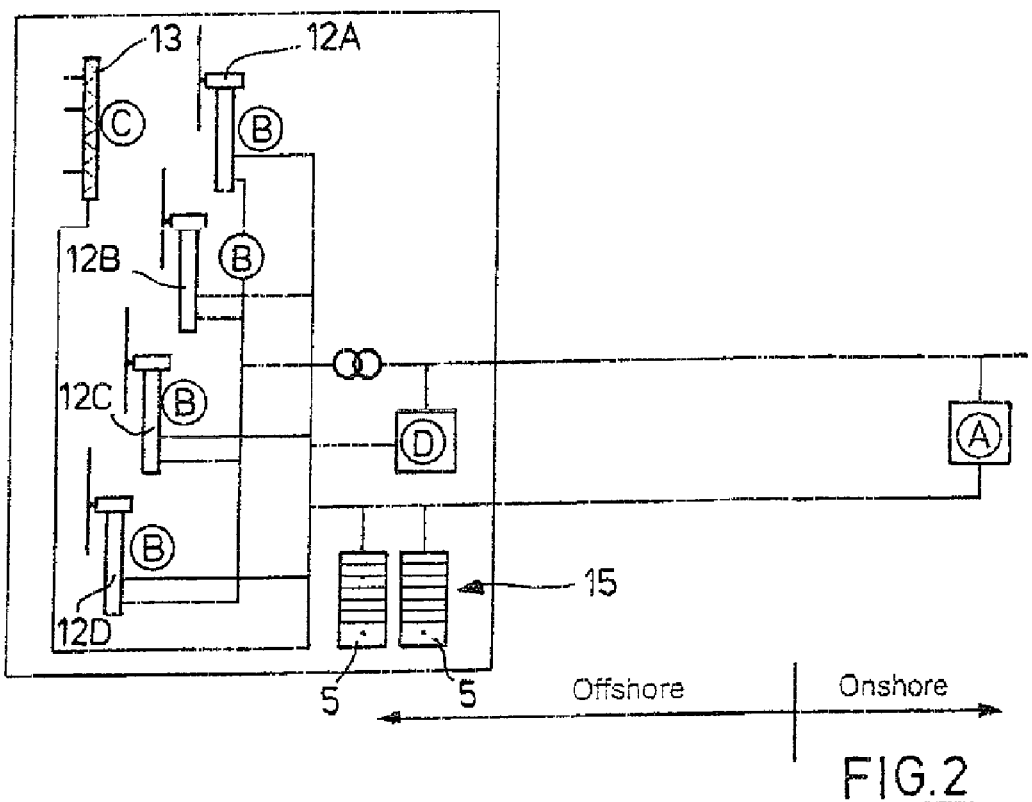
FIG. 2 shows a further schematic representation of the wind energy park from FIG. 1.

In FIG. 2, the wind energy park of FIG. 1 is shown, wherein priorities according to the importance of the control tasks for the operation of the wind energy park performed by them have been assigned to the control units 1, 2A, 2B, 2C, 2D. In this, priority A is the highest priority, priority B the next lower one, priority C the next lower and priority D the lowermost priority. In the shown example, a wind energy park has to fulfil certain grid connection conditions of a state or of energy supply companies, in order to be permitted to be operated. Such conditions concerning power reduction, voltage control, reactive power control and so on occur at a certain transmission point, at the control unit 1 in the shown example, which may be located many kilometers away from the remaining components of the wind energy park. The reactive power can deviate very strongly from the wind energy plant production, through cable capacities, transformer inductivities, and as the case may be it has to be readjusted in order to fulfil the preset requirements. Also, it may be necessary in certain situations to perform an active power reduction preset by the energy supply company, in order to protect the grid from overload. As a consequence, the central control unit 1 must always be available for control and regulation. For this reason, the control unit 1 receives the highest priority A. In order to be able to operate the wind energy park in an economic way, the wind energy plants must produce power, thus the wind energy plant controls receive the next lower priority B. The surveillance of the weather with the weather mast 13 and the assigned control unit 3 as well as the surveillance of a further measurement point with the control unit 4 are less important however, so that the same receive the lower priorities C and D. Of course, the priorisitations may be different from project to project. For instance, it is possible that grid connection rules cannot be fulfilled in exceptional situations, and thus even the control unit 1 receives a lower priorisitation.

The method of the present invention will be explained by means of an example.

All control units 1, 2A, 2B, 2C, 2D, 3, 4 of the wind energy park communicate continuously, every second for instance, with the servers 5 of the central communication unit 15, and by doing so they transmit their respective status, amongst others. Of course, the course in time of the cycle of the communication may even be different. Now, for instance the wind energy plant 12C notifies a malfunction via its control unit 2C, so that the plant 12C can no more be operated. In spite of this, the control unit 2C is still ready for function. Thus, for instance the lowest priority D or a still lower priority can now be assigned to it. Next, the wind energy plant 12D does no more participate in the communication via its control unit 2D. Thus, a failure of the control unit 2D may be presumed. The control unit 2C of the still-standing wind energy plant 12C can correspondingly take over the control tasks of the defective control unit 2D. Alternatively, even the control unit 3 of the weather mast 3 could take over the control tasks of the control unit 2D. In each case it is ensured that the wind energy plant 12D suited for function can be operated further. The respective control program required for this can be provided in advance at the control unit which takes over the tasks of the defective control unit 2D, or it may be loaded down from the servers 5 of the central communication unit 15.

The decision about the coordination of the control tasks can take place either by a human operator, or it may be performed automatically by the central communication unit 15 through preset priority patterns or auto-adaptive optimisation functions. In case that the replacing control unit downloads the control program of the defective control unit 2D into its memory, alternatively or in addition to its own program, it receives furthermore the necessary last settings of the defective control unit, like the parameter set as well as possible addresses of sensors and actuators, from the central communication unit 15, and then it can start the control program of the wind energy plant 12D. In case that the control unit 3 of the weather mast 13 has taken over the control tasks of the control unit 2D, it is furthermore possible that thereafter, the now not needed control unit 2C of the broken wind energy plant 12C takes over the control tasks of the control unit 3 for the weather mast 13 in an analogous way. Thus, it is ensured that no breakdown of control tasks occurs altogether.

A further example of the course of the method of the present invention is shown in the following Table 1:

| Order in time | Controls | | | | | | | Program/Task not executable | Event |
|---|---|---|---|---|---|---|---|---|---|
| | 1 | 2A Main B Alt A | 2B Main B Alt A | 2C Main B Alt A | 2D Main B Alt A | 3 Main C Alt B | 4 Main C Alt B | | |
| 1 | A | B | B | B | B | C | D | — | |
| 2 | X | A | B | B | B | C | B | D | Control 1: Breakdown<br>Control 2A: take over task A, stop task B<br>Control 4: take over task B from 2A and stop D |
| 3 | X | X | A | B | B | B | B | C, D | Control 2A: Breakdown<br>Control 2B: take over task A, stop task B<br>Control 3:: take over task B from 2B and stop C |
| 4 | X | X | X | A | B | B | B | B, C, D | Control 2B: Breakdown<br>Control 2C:: take over task A, stop task B<br>Control 2B: takes over the tasks of control 4 |
| 5 | A | X | X | B | B | B | B | B, C | Control 1 is available again and takes over task A<br>Control 2C: takes over task B again |
| 6 | A | B | B | B | B | C | D | — | All controls work with original tasks again. |

In this, an order in time of different events 1 to 6 is shown in the first column, wherein the smallest number represents the first event in time and the last number the last event in time. In the further columns 2 to 8, the different controls 1, 2A, 2B, 2C, 2D, 3 and 4 of the wind energy park are listed. Whereas the control unit 1 performs in principle control tasks of priority A, control tasks of priority B and C are assigned to the remaining control units 2A, 2B, 2C, 2D, 3 and 4 as main control tasks in the normal case. ("Main B" and "Main C", respectively). However, alternatively they can take over further control tasks, of priorities A and B, for instance ("Alt A" and "Alt B", respectively). At the different points in time 1 to 6, the control tasks of different priorities A, B, C, D performed respectively by the control units 1 to 4 are represented in the columns 2 to 8 of the table. An X in a table cell indicates that the control unit provided in the associated columns can no more exert its task due to a failure. In the next column are listed such control tasks or control programs, respectively, which at certain points in time or upon certain events, as listed in the last column, can no more be performed by any control unit.

In Table 1, an example for the co-ordination of the control units without a separate central communication unit is shown. The control units communicate with each other and with the central wind energy park control 1, and in this, they transmit their respective status. In addition, in this case, they can download the control program necessary for fulfilling the tasks and the actual settings from the central wind energy park control into a memory (own flash memory, for instance) at any time. For this purpose, the corresponding control data can be determined from the central wind energy park control 1 and filed, for instance in a cyclical manner. By the pre-configuration with main and alternative control tasks it is ensured that in the case of a breakdown of one control unit, another control unit with the same as or a lower priority than the defective control unit takes over the tasks of the defective control unit.

A further example is explained by means of the following Table 2:

| Order in time | Controls | | | | | | | Program/Task not executable | Event |
|---|---|---|---|---|---|---|---|---|---|
| | 1 | 2A | 2B | 2C | 2D | 3 | 4 | | |
| 1 | A | B | B | B | B | C | D | — | |
| 2 | X | B | B | B | B | C | A | D | Control 1: Breakdown<br>Control 4: take over task A, do not take into account task D |
| 3 | X | X | B | B | B | X | A | B, C, D | Control 2A + 3: Breakdown<br>No redistribution |
| 4 | X | X | A | B | B | X | X | B, B, C, D | Control 4: Breakdown<br>Control 2B: takes over the task of Control 4 |
| 5 | X | X | B | B | B | X | A | B, C, D | Control 4 available again<br>Control 4 has the lowest priority and takes over the task with the highest priority |

-continued

| Order in time | \multicolumn{7}{c|}{Controls} | Program/Task not executable | Event |
|---|---|---|---|---|---|---|---|---|---|
| | 1 | 2A | 2B | 2C | 2D | 3 | 4 | | |
| 6 | X | X | B | B | B | B | A | C, D | Control 2B: takes over the highest open priority, here B<br>Control 3: available again<br>Control 3: takes over the highest open priority, here B |
| 7 | A | X | B | B | B | B | C | D | Control 1: available again<br>Control 1: takes over the original task, here A<br>Control 4: takes over the highest open capacity, here C |
| 8 | A | B | B | B | B | C | D | — | Control 2A: available again<br>Control 2A: takes over the original task, here B<br>Control 3: takes over the original task, here C<br>Control 4, takes over the original task, here D |

Like in the example explained in Table 1, even in this example one control unit can process only one control task at the same time, due to its memory or its processor performance. In this example, the control units communicate continuously with each other via the central communication unit 15. In this, the central communication unit 15 is always informed about the status of the individual control units, and it co-ordinates the takeover of control tasks of defective control units through other control units. For this purpose, suitable prioritisation tables are provided in the central communication unit 15. Furthermore, it is ensured by the central communication unit 15 that the respective necessary control programs are made available for the control units.

The following Table 3 shows a further example of the method of the present invention:

| Order in time | \multicolumn{7}{c|}{Controls} | Program/Task not executable | Event |
|---|---|---|---|---|---|---|---|---|---|
| | 1 | 2A | 2B | 2C | 2D | 3 | 4 | | |
| 1 | A | B | B | B | B | C | D | — | |
| 2 | X | B | B | B | B | C | D, A | — | Control 1: Breakdown<br>Control 4: take over task A in addition |
| 3 | X | X | B, C | B, D | B | X | A, B | — | Control 2A + 3: Breakdown<br>Control 4: remove task D in favour of task B<br>Control 2B takes over task with priority C<br>Control 2C takes over task with priority D |
| 4 | X | X | B, C | B, B | B, A | X | X | D | Control 4: Breakdown<br>Control 2D: still has capacity and takes over the task from control 4<br>Control 2C takes over the task with priority B from control 4 instead of a task with priority D<br>Control 2B: can remain as it is |
| 5 | X | X | B, C | B | B, D | X | A, B | — | Control 4: available again<br>Control 4 has the lowest priority and takes over the task with the highest priorities, here A and B from controls 2D und 2C<br>Control 2D: has free capacity and takes over task with priority D<br>Control 2C: receives free capacities<br>Control 2B: can remain as it is |
| 6 | X | X | B | B | B | C, D | A, B | — | Control 3: available again<br>Control 3: because all tasks of higher priority run on the original controls or on the controls with lower priorities, respectively, it takes over the original task and the task with lowermost priority<br>Control 2B und 2D: receive free capacities |

| Order in time | 1 | 2A | 2B | 2C | 2D | 3 | 4 | Program/Task not executable | Event |
|---|---|---|---|---|---|---|---|---|---|
| 7 | A | X | B | B | B | C | D, B | — | Control 1: available again<br>Control 1: takes over the original task, here A<br>Control 4: takes over the original task, here D<br>Control 3: receives free capacities |
| 8 | A | B | B | B | B | C | D | — | Control 2A: available again<br>Control 2A: takes over the original task, here B<br>Control 4: receives free capacities |

In this, an example similar to that of Table 2 is represented. In difference to the example from Table 2, due to their higher performance, some control units are able to process plural control programs at the same time, and thus to take over plural control tasks. In the represented example, some of the control units can perform two control tasks at the same time. In this way, the availability of the plant can be increased further.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for controlling a wind energy park with plural wind energy plants and plural control units which perform control tasks in the wind energy park, comprising the following steps:
   a) one priority at a time is assigned to the control units (1, 2A, 2B, 2C, 2D, 3, 4), depending on the control tasks they must perform,
   b) during the operation of the wind energy park, the control units (1, 2A, 2B, 2C, 2D, 3, 4) communicate continuously with each other and/or with a central communication unit (15),
   c) in case that there is a failure of a first control unit (1, 2A, 2B, 2C, 2D, 3, 4) of the wind energy park, a second control unit (1, 2A, 2B, 2C, 2D, 3, 4) of the wind energy park takes over the control tasks of the defective (1, 2A, 2B, 2C, 2D, 3, 4) control unit, wherein the second control unit is selected depending on the priority assigned thereto and has the same as or a lower priority than the defective (1, 2A, 2B, 2C, 2D, 3, 4) control unit, and
   d) in case of a failure of a wind energy plant a first control unit that had been controlling it is assigned to a wind energy slant whose control unit has a failure.

2. A method according to claim 1, characterised in that the second control unit (1, 2A, 2B, 2C, 2D, 3, 4) has performed own control tasks before taking over the control tasks of the defective control unit (1, 2A, 2B, 2C, 2D, 3, 4).

3. A method according to claim 2, characterised in that after taking over the control tasks of the defective control unit (1, 2A, 2B, 2C, 2D, 3, 4), the second control unit (1, 2A, 2B, 2C, 2D, 3, 4) continues to perform its own control tasks which it had performed before.

4. A method according to claim 2, characterised in that after taking over the control tasks of the defective control unit (1, 2A, 2B, 2C, 2D, 3, 4), the second control unit (1, 2A, 2B, 2C, 2D, 3, 4) does no more perform its own control tasks which it had performed before.

5. A method according to claim 4, characterised in that a third control unit (1, 2A, 2B, 2C, 2D, 3, 4) of the wind energy park (1, 2A, 2B, 2C, 2D, 3, 4) takes over the control tasks of the second control unit (1, 2A, 2B, 2C, 2D, 3, 4).

6. A method according to claim 5, characterised in that the third control unit (1, 2A, 2B, 2C, 2D, 3, 4) is selected depending on the priority assigned thereto and has the same as or a lower priority than the second control unit (1, 2A, 2B, 2C, 2D, 3, 4).

7. A method according to claim 1, characterised in that the second control unit (1, 2A, 2B, 2C, 2D, 3, 4) is a replacement control unit, which did not perform any own control tasks before taking over the control tasks of the defective control unit (1, 2A, 2B, 2C, 2D, 3, 4).

8. A method according to claim 1, characterised in that after taking over the control tasks of a second control unit (1, 2A, 2B, 2C, 2D, 3, 4) which has a higher priority, the higher priority of the second control unit (1, 2A, 2B, 2C, 2D, 3, 4) is assigned to a first control unit (1, 2A, 2B, 2C, 2D, 3, 4) for so long as it performs the control tasks of the second control unit (1, 2A, 2B, 2C, 2D, 3, 4).

9. A method according to claim 1, characterised by the further procedural step that in case that there is a failure of a first control unit (1, 2A, 2B, 2C, 2D, 3, 4) of the wind energy park, a second control unit (1, 2A, 2B, 2C, 2D, 3, 4) of the wind energy park, which has performed its own control tasks before, takes over the control tasks of the defective control unit (1, 2A, 2B, 2C, 2D, 3, 4), wherein the second control unit (1, 2A, 2B, 2C, 2D, 3, 4) is selected depending on whether it has sufficient capacity for performing the control tasks of the defective control unit (1, 2A, 2B, 2C, 2D, 3, 4) in addition to its owns control tasks, and subsequently, the second control unit (1, 2A, 2B, 2C, 2D, 3, 4) performs its own control tasks as well as the control tasks of the defective control unit (1, 2A, 2B, 2C, 2D, 3, 4).

10. A method according to claim 9, characterised in that at least one control unit (1, 2A, 2B, 2C, 2D, 3, 4) has at least one control program for performing the control tasks of at least one other control unit (1, 2A, 2B, 2C, 2D, 3, 4) of the wind energy park.

11. A method according to claim 1, characterised in that at least one control unit (1, 2A, 2B, 2C, 2D, 3, 4) has at least one control program for performing the control tasks of at least one other control unit (1, 2A, 2B, 2C, 2D, 3, 4) of the wind energy park.

12. A method according to claim 1, characterised in that the control units (1, 2A, 2B, 2C, 2D, 3, 4) retrieve a control program for performing the control tasks of another control unit (1, 2A, 2B, 2C, 2D, 3, 4) from a central communication unit (15) according to necessity, before taking over the control tasks of the other control unit (1, 2A, 2B, 2C, 2D, 3, 4).

13. A method according to claim 1, characterised in that the control units (1, 2A, 2B, 2C, 2D, 3, 4) communicate with a central communication unit (15) and that the central communication unit (15) performs the assignment of the control tasks to the control units (1, 2A, 2B, 2C, 2D, 3, 4) in case of a failure of a control unit (1, 2A, 2B, 2C, 2D, 3, 4).

14. A method according to claim 1, characterised in that the control units (1, 2A, 2B, 2C, 2D, 3, 4) communicate with each other, and that the assignment of the control tasks to the control units (1, 2A, 2B, 2C, 2D, 3, 4) in case of a failure of a control unit (1, 2A, 2B, 2C, 2D, 3, 4) takes place automatically, according to an order which was preset before.

15. A method for controlling a wind energy park with plural wind energy plants and plural control units which perform control tasks in the wind energy park, comprising the following steps:

a) during the operation of the wind energy park, the control units (1, 2A, 2B, 2C, 2D, 3, 4) communicate continuously with each other and/or with a central communication unit (15), b) in case that there is a failure of a first control unit (1, 2A, 2B, 2C, 2D, 3, 4) of the wind energy park, a second control unit (1, 2A, 2B, 2C, 2D, 3, 4) of the wind energy park, which has performed its own control tasks before, takes over the control tasks of the defective control unit (1, 2A, 2B, 2C, 2D, 3, 4), wherein the second control unit (1, 2A, 2B, 2C, 2D, 3, 4) is selected depending on whether it has sufficient capacity for performing the control tasks of the defective control unit (1, 2A, 2B, 2C, 2D, 3, 4) in addition to its owns control tasks, and subsequently, the second control unit (1, 2A, 2B, 2C, 2D, 3, 4) performs its own control tasks as well as the control tasks of the defective control unit (1, 2A, 2B, 2C, 2D, 3, 4), and c) in case of a failure of a wind energy plant a first control unit that had been controlling it is assigned to a wind energy slant whose control unit has a failure.

16. A method according to claim 15, characterised in that at least one control unit (1, 2A, 2B, 2C, 2D, 3, 4) has at least one control program for performing the control tasks of at least one other control unit (1, 2A, 2B, 2C, 2D, 3, 4) of the wind energy park.

17. A method according to claim 11, characterised in that the control units (1, 2A, 2B, 2C, 2D, 3, 4) retrieve a control program for performing the control tasks of another control unit (1, 2A, 2B, 2C, 2D, 3, 4) from a central communication unit (15) according to necessity, before taking over the control tasks of the other control unit (1, 2A, 2B, 2C, 2D, 3, 4).

18. A method according to claim 15, characterised in that the control units (1, 2A, 2B, 2C, 2D, 3, 4) communicate with a central communication unit (15) and that the central communication unit (15) performs the assignment of the control tasks to the control units (1, 2A, 2B, 2C, 2D, 3, 4) in case of a failure of a control unit (1, 2A, 2B, 2C, 2D, 3, 4).

19. A method according to claim 15, characterised in that the control units (1, 2A, 2B, 2C, 2D, 3, 4) communicate with each other, and that the assignment of the control tasks to the control units (1, 2A, 2B, 2C, 2D, 3, 4) in case of a failure of a control unit (1, 2A, 2B, 2C, 2D, 3, 4) takes place automatically, according to an order which was preset before.

* * * * *

UNITED STATES PATENT AND TRADEMARK OFFICE
CERTIFICATE OF CORRECTION

| | | |
|---|---|---|
| PATENT NO. | : 7,949,434 B2 | Page 1 of 1 |
| APPLICATION NO. | : 12/174447 | |
| DATED | : May 24, 2011 | |
| INVENTOR(S) | : Mark Jurkat | |

It is certified that error appears in the above-identified patent and that said Letters Patent is hereby corrected as shown below:

In column 2, line 23, the word "masters" into master
In column 2, line 65, the word "difficulty" into "difficultly"
In column 4, line 1, the word "owns" into "own"
In column 5, line 2, the word "multiplicate" into "multiple"
In column 5, line 34, a "." is placed at the end of the sentence
In column 5, line 48, the word "measurement-" into "measurement"
In column 6, lines 23 and 26, the word "priorisitation(s)" into "prioritization(s)"
In column 10, line 23, the word "priorisitation" into "prioritization(s)"
In column 12, line 32, the word "slant" into "plant"
In column 14, line 21, the word "slant" into "plant"

Signed and Sealed this
Eleventh Day of October, 2011

David J. Kappos
*Director of the United States Patent and Trademark Office*